United States Patent [19]

Bederke et al.

[11] Patent Number: 5,663,233

[45] Date of Patent: Sep. 2, 1997

[54] COATING AGENTS AND THE USE THEREOF IN PROCESSES FOR THE PRODUCTION OF MULTI-LAYER COATINGS

[75] Inventors: Klaus Bederke, Sprockhövel; Friedrich Herrmann; Hermann Kerber, both of Wuppertal; Thomas Kutzner, Sprockhövel; Hans-Martin Schönrock, Wuppertal, all of Germany

[73] Assignee: Herberts Gesellschaft Mit Beschrankter Haftung, Wuppertal, Germany

[21] Appl. No.: 492,291

[22] Filed: Jun. 19, 1995

[30] Foreign Application Priority Data

Jun. 20, 1994 [DE] Germany ............... 44 21 525.8

[51] Int. Cl.⁶ ............... C08L 67/02; C08L 67/04; C08L 61/28; C08L 33/02

[52] U.S. Cl. ............... 525/173; 525/174; 525/176; 525/177; 525/450; 525/451; 525/519

[58] Field of Search ............... 525/173, 174, 525/176, 177, 450, 451, 519

[56] References Cited

U.S. PATENT DOCUMENTS 3,994,851  11/1976  Bederke et al. ............... 260/29.4

FOREIGN PATENT DOCUMENTS

2824418 C2  12/1978  Germany.
3114688 A1  10/1982  Germany.
4036379 A1  5/1992  Germany.
WO 9212590  2/1992  WIPO.

OTHER PUBLICATIONS

Derwent English Abstract, WPI Acc. No. 78–87843A/49 corresponding to DE 2822448 C2 Aug. 9, 1990.
Derwent English Abstract, WPI Acc. No. 82–92894E/44 corresponding to DE 3114688 A1 Apr. 10, 1981.
Derwent English Abstract, WPI Acc. No. 92–049974/07 corresponding to WO 92/02590 Feb. 20, 1992.
Derwent English Abstract, WPI Acc. No. 92–175963/22 corresponding to DE 4036379 A1 Nov. 15, 1990.

*Primary Examiner*—W. Robinson H. Clark
*Attorney, Agent, or Firm*—Merchant, Gould, Smith Edell, Welter & Schmidt

[57] ABSTRACT

A solvent based coating composition containing a binding agent, the binding agent comprising: (a) 10 to 80 wt.% of at least one hydroxyfunctional polyester formed by reacting a mixture comprising: (i) 10 to 40 mol.% of a 2,2-dialkylalkanediol with two primary OH groups; (ii) 10 to 30 mol.% of a polyol with at least one secondary OH group; (iii) 20 to 50 mol.% of an aliphatic or cycloaliphatic dicarboxylic acid with fewer than 16 C atoms or anhydrides thereof; (iv) 5 to 30 mol.% of a compound selected from the group consisting of dimeric fatty acids, dimeric diols, epsilon-caprolactone, and mixtures thereof; (v) 1 to 15 mol.% of a hydroxycarboxylic acid with at least one hydroxy group and at least one carboxyl group; and (b) 10 to 80 wt.% of a (meth)acrylic copolymer containing a hydroxyl group; and (c) 10 to 60 wt.% of a crosslinking agent; wherein the sum of the wt.% of components (a)–(c) is 100% of the binding agent.

18 Claims, No Drawings

COATING AGENTS AND THE USE THEREOF IN PROCESSES FOR THE PRODUCTION OF MULTI-LAYER COATINGS

The invention relates to coating agents which are suitable in particular for transparent but also for pigmented multi-layer stoving coatings, for example in the mass-production lacquering of motor vehicles, which are characterised by a high resistance to acid rain and a high scratch resistance.

DE-A-39 18 968 describes by way of scratch-resistant clear lacquers, inter alia, coating agents that cure with free or blocked polyisocyanates and that are based on a combination of low-molecular polyol with a weight average molecular weight of 2,000 and a hydroxyl number of 150 to 400 mg KOH/g and acrylic resin containing hydroxyl groups with a weight average molecular weight of 5,000 to 50,000 and a hydroxyl number of 50 to 180 mg KOH/g. The low-molecular polyol may be a branched-chain polyester polyol. By way of preferred structural components of the branched-chain polyester polyol, mention may be made, for example, of cyclohexanedimethanol, trimethylolpropane and succinic anhydride or adipic acid. Dimeric acid should where possible be used in only a small amount. The acid resistance of the lacquer coatings obtained and the scratch resistance need to be improved.

It is known that no systems have existed hitherto which are suitable in particular for motor-vehicle lacquering and which have both an extreme acid resistance and an extreme scratch resistance (I-Lack, 1/93, 61st year, pages 30 to 34, in particular page 34).

The object of the invention is the provision of coating agents for multi-layer stoving coatings, in particular for the mass-production lacquering of motor vehicles, which result in coatings having a high acid resistance, in particular an improved resistance to sulphuric acid, and also a high scratch resistance.

It has been shown that the requirement for coatings which are resistant to sulphuric acid and at the same time scratch-resistant can be fulfilled by coatings that contain one or more hydroxylfunctional polyester resins, one or more hydroxylfunctional (meth)acrylic copolymers, crosslinking agents, customary lacquering additives and solvents. The coating agents are characterised in that they contain binding agents based on A) 10 to 80 wt-% of one or more hydroxyfunctional polyesters which can be obtained by reaction of:
   a1) 0 to 30 mol-% of one or more glycidyl esters of alpha,alpha-dialkyl-substituted aliphatic monocarboxylic acids,
   a2) 10 to 40 mol-%, preferably 20 to 40 mol-%, of one or more 2,2-dialkylalkanediols,
   a3) 10 to 30 mol-%, preferably 10 to 20 mol-%, of one or more polyols with at least one secondary OH group in the molecule,
   a4) 20 to 50 mol-%, preferably 25 to 45 mol-%, of one or more aliphatic and/or cycloaliphatic dicarboxylic acids with fewer than 16 C atoms or anhydrides thereof,
   a5) 5 to 30 mol-% of one or more dimeric fatty acids and/or dimeric diols and/or epsilon-caprolactone,
   a6) 1 to 15 mol-%, preferably 3 to 12 mol-%, of one or more hydroxycarboxylic acids with at least one hydroxyl group and at least one carboxyl group in the molecule,
   a7) 0 to 3 mol-% of one or more alpha,beta-unsaturated dicarboxylic acids or anhydrides thereof,
whereby the sum of the mol-% of a1) to a7) in each case makes up 100%, B) 10 to 80 wt-% of one or more (meth)acrylic copolymers containing hydroxyl groups, C) 10 to 60 wt-% of one or more crosslinking agents, whereby the sum of the wt-% of the components A) to C) in each case makes up 100%.

The hydroxyfunctional polyesters used by way of component A) represent polycondensation products formed from the components a1) to a7). Such polyesters are as a rule produced with an excess of alcohol. The OH numbers preferably lie in the range from 40 to 200, in particular from 80 to 180 mg KOH/g, the acid numbers lie for example in the range from 5 to 100, preferably from 10 to 40. The weight average molecular weights amount for example to between 500 and 6,000, preferably between 1,000 and 4,000 g/mol.

The component A) may be produced in various ways from the components a1) to a7). Production may be effected stepwise or preferably in a one-pot process. The reaction of the reactants may be carried out at elevated temperature—eg, at temperatures of 120° to 240° C.—until the desired degree of polycondensation has been attained.

By way of component a1), use may be made of glycidyl esters of alpha,alpha-dialkyl-substituted aliphatic monocarboxylic acids. Such compounds are commercially obtainable—eg, glycidyl esters of alpha,alpha-dialkyl-substituted aliphatic monocarboxylic acids with 9 to 11 carbon atoms, of neodecanoic acids for example, Cardura R commercial products such as Cardura-E10 which is manufactured by Shell.

Compounds that serve as component a2) are 2,2-dialkylalkanediols, in particular those with more than 5 C atoms in the molecule. Particularly preferred are 2,2-dialkylalkanediols-1,3, in particular with more than 5 C atoms in the molecule; examples of such compounds are 2-ethyl-2-butylpropanediol-1,3, 2-ethyl-2-hexylpropanediol-1,3, 2-ethyl-2-ethylhexylpropanediol-1,3, 2,2-di-tert.-butylpropanediol-1,3, 2,2-diethylpropanediol-1, 3. Use is preferably made of 2-ethyl-2-hexylpropanediol-1,3 and 2,2-di-ethylpropanediol1,3.

By way of component a3), use may be made of polyols with at least one secondary OH group in the molecule. These preferably contain at least two primary OH groups. Examples of such compounds are glycerine and hexanetriol-1,2,6.

By way of component a4), use is-made of(cyclo)aliphatic polycarboxylic acids or anhydrides thereof, in particular dicarboxylic acids. Examples of aliphatic dicarboxylic acids are succinic acid, adipic acid, sebacic acid, dodecanedicarboxylic acid. Particularly preferred are cycloaliphatic dicarboxylic acids, for example 1,2-, 1,3-and 1,4-cyclohexanedicarboxylic acid and 1,2-cyclohexanedicarboxylic anhydride.

By way of component a5), use is made of one or more dimeric fatty acids and/or dimeric diols and/or epsilon-caprolactone. The dimeric fatty acids and dimeric diols are preferably hydrated products—ie, products that are free from olefinic double bonds. The dimeric fatty acids and/or dimeric diols are preferably used in quantities from 5 to 15 mol-%. Epsilon-caprolactone is preferably used in quantities from 15 to 30 mol-%.

By way of component a6), use is made of hydroxycarboxylic acids. In particular, use is made of hydroxycarboxylic acids with a carboxyl group that is bonded in tertiary manner. Preferred examples of such compounds are 2,2-dialkyl-omega-hydroxyalkylcarboxylic acids-1, whereby the alkyl residues comprise, for example, 6 carbon atoms. Special examples are 2,2-dimethylolpropionic acid and 3-hydroxypivalic acid.

By way of component a7), use may be made of alpha, beta-unsaturated dicarboxylic acids or anhydrides thereof. Examples are maleic acid, fumaric acid, itaconic acid. Particularly preferred is maleic anhydride.

Preferred examples of hydroxyfunctional polyesters for component A) may be produced from 2-ethyl-2-butylpropanediol-1,3 by way of component a2), glycerine and/or hexanetriol-1,2,6 by way of component a3), 1,2-cyclohexanedicarboxylic anhydride and/or 1,4-cyclohexanedicarboxylic acid by way of component a4), dimeric fatty acid, dimeric diol and/or epsilon-caprolactone by way of component a5), dimethylolpropionic acid by way of component a6) and maleic anhydride by way of component a7). A particularly preferred polyester component A) is produced from 2-ethyl-2-butylpropanediol-1,3 by way of component a2), glycerine by way of component a3), 1,2-cyclohexanedicarboxylic anhydride by way of component a4), dimeric fatty acid by way of component a5) and dimethylolpropionic acid by way of component a6).

The production of the (meth) acrylic copolymers (component B) contained in the coating agent according to the invention may, for example, be carried out by polymerisation in accordance with customary processes—eg, substance, solution or bead polymerisation. The various polymerisation processes are well-known and described, for example, in Houben-Weyl, Methoden der Organischen Chemie, 4th Edn., Volume 14/1, pp 24–255 (1961).

The solution polymerisation process is preferred for the production of the (meth)acrylic copolymers that are used in the coating agent according to the invention. With this process the solvent is submitted into the reaction vessel, heated to boiling-temperature and the monomer/initiator mixture is charged continuously within a defined time. The solution polymerisation may, however, also be carried out in such a way that the monomers are added at different times—ie, alternating or in sequence.

The polymerisation is carried out, for example, at temperatures between 60° C. and 160° C., preferably at 80° C. to 140°C.

The polymerisation reaction may be started with known polymerisation initiators. Suitable initiators are customary per and azo compounds which decompose thermally into radicals in a first-order reaction. The type and quantity of initiator are chosen in such a way that at the polymerisation temperature during the feed phase the supply of radicals is as constant as possible.

Examples of initiators which are preferably used for the polymerisation are: dialkylperoxides such as di-tert.-butylperoxide, di-cumylperoxide; diacylperoxides such as di-benzoylperoxide, di-laurylperoxide; hydroperoxides such as cumenehydroperoxide, tert.-butylhydroperoxide; peresters such as tert.-butylperbenzoate, tert.-butylperpivalate, tert.butyl-per-3,5,5-trimethylhexanoate, tert.-butyl-per-2-ethylhexanoate; peroxydicarbonates such as di-2-ethylhexyl-peroxydicarbonate, dicyclohexylperoxydicarbonate; perketals such as 1,1-bis-(tert.-butylperoxy)-3,5,5-trimethylcyclohexane, 1,1-bis-(tert.-butylperoxy) cyclohexane; ketoneperoxides such as cyclohexanoneperoxide, methylisobutylketoneperoxide; azo compounds such as 2,2'-azo-bis(2,4-dimethylvaleronitrile), 2,2'-azo-bis(2-methylbutyronitrile), 1,1'-azo-bis-cyclohexanecarbonitrile, azo-bis-isobutyronitrile.

The polymerisation initiators, in particular the peresters, are preferably used in a quantity from 0.2 to 5 wt-% in relation to the weighed sample of monomer.

Suitable, for example, by way of organic solvents which are used expediently in the solution polymerisation and also subsequently in the coating agent according to the invention are glycol ethers such as ethyleneglycol dimethylether; glycolether esters such as ethylglycol acetate, butylglycol acetate, 3-methoxy-n-butyl acetate, butyldiglycol acetate, methoxypropyl acetate; esters such as butyl acetate, isobutyl acetate, amyl acetate; ketones such as methylethyl ketone, methylisobutyl ketone, diisobutyl ketone, cyclohexanone, isophorone; alcohols such as methanol, ethanol, propanol, butanol; aromatic hydrocarbons such as xylene, Solvesso 100 (registered trade mark) and aliphatic hydrocarbons may also be used, in particular in a blend with the solvents stated above.

With a view to regulating the molecular weight, concomitant use may be made, in particular in the case of the preferred solution polymerisation, of customary chain-transfer agents. Examples are functionalised or non-functionalised mercaptans such as mercaptoethanol, n-octylmercaptan, thioglycolic ester, chlorinated hydrocarbons, cumene, dimeric alpha-methylstyrene.

The polymerisation conditions (reaction temperature, feed time of the monomer mixture, solution concentration) are adjusted in such a way that the (meth)acrylic copolymers for the coating agents produced in accordance with the invention preferably have a weight average molecular weight (Mw) (determined by gel permeation chromatography using polystyrene as calibrating substance) between 2,000 and 20,000.

The (meth)acrylic copolymers containing hydroxyl groups of the coating agent produced in accordance with the invention preferably lie within a second-order transition temperature range from $-20°$ C. to $+80°$ C., calculated from the second-order transition temperatures of the homopolymers of the individual monomers as stated in the literature (FOX equation, see, for example, Polymere Werkstoffe, Batzer, 1985, page 307).

By way of monomer component for the production of the (meth)acrylic copolymers (component B) containing hydroxyl groups, use is preferably made of alkyl esters of acrylic acid or methacrylic acid. The term (meth)acrylic here is to be taken to mean acrylic and/or methacrylic. Examples of such compounds are: methyl acrylate, methyl methacrylate, ethyl acrylate, ethyl methacrylate, isopropyl methacrylate, tert.-butyl acryiate, n-butyl acrylate, n-butyl methacrylate, isobutyl acrylate, isobutyl methacrylate, cyclohexyl methacrylate, trimethylcyclohexyl methacrylate, 2-ethylhexyl acrylate, 2-ethylhexyl methacrylate, lauryl acrylate, lauryl methacrylate, stearyl acrylate, stearyl methacrylate, isobornyl acrylate, isobornyl methacrylate; hydroxyalkyl esters of acrylic acid or methacrylic acid such as beta-hydroxyethyl acrylate, beta-hydroxyethyl methacrylate, beta-hydroxypropyl acrylate, beta-hydroxypropyl methacrylate, butanediol-1,4-monoacrylate, butanediol-1,4-monomethacrylate, hexanediol-1,6-monoacrylate, hexanediol-1,6-monomethacrylate.

But use may also be made, at least in part, of polyalkylene oxide-mono-(meth)acrylates with 2 to 10 alkylene oxide units per molecule.

Furthermore, use may be made of reaction products of hydroxyalkyl (meth)acrylates with epsilon-caprolactone.

Hydroxyfunctional monomers such as hydroxyalkyl esters of acrylic acid or methacrylic acid are incorporated by polymerisation in such quantities that for component B) an OH number preferably results of 30 to 200 mg KOH/g.

With a view to endowing the (meth)acrylic copolymer with carboxyl groups, unsaturated acids such as, for example, (meth)acrylic acid, maleic cid, fumaric acid and the half-esters thereof may be incorporated-by polymerisation. They are incorporated by polymerisation in such quantities that for the component B) an acid number preferably results of 1 to 50 mg KOH/g.

With a view to producing the copolymers, concomitant use may also be made of comonomers that differ from the (meth)acrylic monomers. Suitable, for example, are vinyl monomers such as vinyl aromatics—eg, styrene, vinyltoluene, p-methylstyrene and p-tert.-butylstyrene; vinyl ethers such as isobutyl vinyl ether; vinyl esters such as vinyl acetate, vinyl propionate, vinyl benzoate, p-tert.-butylvinyl benzoate and vinyl neodecanoate. The comonomers may be used in quantities up to 50 wt-%, for example 10 to 50 wt-%, preferably 10 to 30 wt-%, in each case relative to the weight of the totality of monomers.

Proportional use may also be made of multiply unsaturated monomers—eg, divinylbenzene, ethyleneglycol di(meth)acrylate, butanediol di(meth)acrylate. Such monomers are added in small quantities—ie, in such quantities that the products obtained do not gel.

The coating agents according to the invention contain by way of component C) customary lacquering crosslinking agents, for example aminoplastic resins and/or blocked and/or non-blocked diisocyantes and polyisocyanates that are customary in lacquering. The coating agents according to the invention preferably contain diisocyanates and/or polyisocyanates by way of crosslinking agents.

Use may also be made of customary aminoplastic resins. Examples of aminoplastic resins are alkylated condensates which are produced by reaction of aminotriazines and amidotriazines with aldehydes. In accordance with known technical processes, compounds comprising amino and amido groups such as melamine, benzoguanamine, dicyanodiamide, urea, N,N'-ethylene urea are condensed with aldehydes, in particular formaldehyde, in the presence of alcohols such as methyl, ethyl, propyl, iso-butyl, n-butyl and hexyl alcohol. The reactivity of such amine resins is determined by the degree of condensation, the ratio of the amine or amide component to the formaldehyde and by the type of the etherification alcohol employed. Use is preferably made of melamine resins which are etherified with n-butanol or iso-butanol with a degree of etherification $\leq 1.0$.

The aminoplastic resins may also be present together with polyisocyanates. The proportion of aminoplastic resins in the mixture preferably amounts in this connection to less than 50 wt-%, relative to the weight of component C).

Suitable by way of polyisocyanates which may be used in the mixture with the aminoplastic resins but preferably also on their own by way of crosslinking component C) are, in particular, aliphatic, cycloaliphatic and araliphatic polyisocyanates. By way of diisocyanates, use is preferably made of hexamethylene-1,6-diisocyanate, 3,5,5-trimethylhexamethylene-1,6-diisocyanate, isophorone diisocyanate, 1,3-bis(isocyanatomethyl)cyclohexane, bis-isocyanato-cyclohexylmethane, tetramethylxylylene diisocyanate (TMXDI).

Also suitable by way of polyisocyanates are, for example, polyisocyanates containing biuret groups: eg, reaction products of 3 moles hexamethylene diisocyanate with 1 mole water with an NCO content of about 22 %, or polyisocyanates containing isocyanurate groups which, for example, are produced by trimerisation of 3 moles hexamethylene diisocyanate with an NCO content of about 21.5 %, or polyisocyanates containing urethane groups which, for example, represent reaction products of 3 moles of aliphatic or cycloaliphatic diisocyanates with 1 mole triol—eg, trimethylolpropane. The aliphatic diisocyanate that is preferably used is isophorone diisocyanate.

The polyisocyanate crosslinking agents may be partially or, in case a coating agent is desired which is storable over a relatively long period—ie, a one-component coating agent, totally blocked with monofunctional compounds containing active hydrogen. The choice of the blocking agent that is again thermally separable subject to re-formation of the free isocyanate groups is guided by the prevailing stoving conditions in the course of the curing of the coating agent according to the invention. The polyisocyanate crosslinking agents are preferably used in the unmasked state.

By way of blocking agents, use may be made for blocking purposes of customary—for example, CH-acidic, NH-functional or OH-functional—compounds which under curing conditions enable crosslinking with hydroxyl-functional binding agents. Examples of useable blocking agents are oximes and CH-acidic compounds such as malonic or acetoacetic esters. In this connection it can be favourable to make use of various masking agents simultaneously, which may be effected within a polyisocyanate molecule or in a mixture.

The coating agents according to the invention may, besides the solvents already stated, additionally contain customary lacquering aids—eg: flow-control agents, for example those based on (meth)acrylic homopolymers, silicone oils; plasticisers such as esters of phosphoric acid, phthalic acid or citric acid; delustering agents such as pyrogenic silicon oxide; rheology-influencing agents such as microgels, NAD (=non-aqueous dispersions), disubstituted ureas ("sagging control agents"), hydrated castor oil; curing accelerators—eg, phosphoric acid, phosphoric acid esters, dicarboxylic acid half-esters, citric acid; organic metal salts such as dibutyl tin dilaurate, zinc naphthenate, and also compounds containing tertiary amino groups such as triethylamine.

The coating agents according to the invention may be formulated in aqueous and non-aqueous form. With a view to the formulation of aqueous coating agents it is expedient to use components A) and B) which have an acid-number range above about 30. These components containing acid functions may then be partially or totally neutralised with amines and then converted into the aqueous phase by dilution with water.

The coating agents according to the invention are particularly suitable for the production of a transparent topcoat (layer of clear lacquer) in the course of the production of stove-drying multi-layer coatings. The topcoat may, for example, be applied in accordance with the wet-on-wet process, whereupon both layers are cured jointly. The invention therefore also relates to the process for the production of multi-layer coatings and the use of the coating agents for production thereof. The solvent-containing coating agents according to the invention may in this connection be applied as topcoat lacquers to layers consisting of aqueous or solvent-containing base lacquers for curable multi-layer coatings.

Pigmented coating agents may also be prepared. To this end, use may be made of customary organic and/or inorganic colouring pigments and/or fillers such as titanium dioxide, micronised titanium dioxide, iron oxide pigments, carbon black, silicon dioxide, barium sulphate, micronised mica, talcum, azo pigments, phthalocyanine pigments, quinacridone or pyrrolopyrrol pigments.

The coating agents according to the invention are applied in accordance with known processes such as spraying, dipping, rolling or application by spatula. In this connection the coating of topcoat lacquer is applied to the substrate which has optionally already been provided with additional layers of lacquer. The coating agents according to the invention may also be applied subject to the use of supercritical carbon dioxide by way of solvent in a spray process. In this connection the content of organic solvents may be greatly reduced. After an evaporation phase the coating agent applied is preferably crosslinked by heating. The stoving temperatures preferably lie between 80° and 160° C., in particular between 120° and 150° C. The curing-times preferably have an order of magnitude of 20 to 40 minutes. The crosslinking may also, however, be carried out at lower temperatures—eg, at 20° to 80° C. The layer thickness of the stoved film amounts to about 15–50 µm. In this connection a crosslinked, hard, glossy lacquer coating is formed. A preferred embodiment is the application of the coating agent according to the invention by way of coating of clear lacquer onto a base lacquer. In this connection, working may be effected wet-on-wet or the base lacquer is previously dried by heating. A particularly good adhesion of the two layers results.

With coating agents formulated in accordance with the invention as clear lacquers, base lacquers may for example be overlacquered which may contain customary topcoat-lacquer pigments, the base lacquers preferably contain effect-creating pigments such as metallic pigments. By way of binding-agent basis of the base lacquer, use is preferably made of polyester resins, polyurethane resins or acrylate resins. These binding agents may optionally be crosslinked by means of crosslinking agents—eg, melamine derivatives or isocyanate derivatives.

The coating agents according to the invention are particularly suitable for topcoat lacquers or clear lacquers which are preferably used in the motor-vehicle industry but also in other fields. The use of the coating agent according to the invention in multi-layer lacquering is particularly suitable for the mass-production lacquering of motor vehicles, but it can also be used for other purposes, such as in the repair lacquering of motor vehicles, for household appliances or in the furniture industry.

The coating agents according to the invention are particularly suitable for the production of a transparent topcoat of a stove-drying multi-layer coating. They are particularly suitable for the mass-production lacquering of motor-vehicle bodies and parts thereof.

The layers of topcoat lacquer produced by the use of the coating agents according to the invention—eg, layers of clear lacquer—are characterised by a superior acid resistance, in particular resistance to sulphuric acid, and an outstanding scratch resistance.

PRODUCTION OF POLYESTERS

Example 1

Into a reaction apparatus that is suitable for synthesis of polyester resin there are weighed 85.5 g (0.929 mol) glycerine, 334.4 g (2.090 mol) 2-ethyl-2-butylpropanediol-1,3 and 25 g xylene and, with stationary stirrer, heated to about 80° C. Then, subject to stirring, 330.4 g (2.146 mol) hexahydrophthalic anhydride, 250.2 g (0.447 mol) dimerised fatty acid and 47.8 g (0.357 mol) dimethylolpropionic acid are added and heated to 220° C. within 6 hours. When an acid number of about 20 mg KOH/g has been attained, cooling is effected to 100° C. and dilution is effected with 428 g Solvesso 100. The polyester-resin solution has a solids content of 70.2% and a viscosity of 1,330 mPa.s/25° C.

Example 2

Into a reaction apparatus that is suitable for synthesis of polyester resin there are weighed 124.1 g (0.929 mol) hexanetriol-1,2,6, 333.3 g (2.083 mol) 2-ethyl-2-butylpropanediol-1,3 and 25 g xylene and, with stationary stirrer, heated to about 80° C. Then, subject to stirring, 320.6 g (1.864 mol) 1,4-cyclohexanedicarboxylic acid, 250.2 g (0.447 mol) dimerised fatty acid, 9 g (0.092 mol) maleic anhydride and 47.8 g (0.357 mol) dimethylolpropionic acid are added and heated to 220° C. within 6 hours. When an acid number of about 20 mg KOH/g has been attained, cooling is effected to 100° C. and dilution is effected with 428 g Solvesso 100. The polyester-resin solution has a solids content of 70.6% and a viscosity of 1,200 mPa.s/25° C.

Example 3

Into a reaction apparatus that is suitable for synthesis of polyester resin there are weighed 79.2 g (0.861 mol) glycerine, 309.9 g (1,937 mol) 2-ethyl-2-butylpropanediol-1,3 and 25 g xylene and, with stationary stirrer, heated to about 80° C. Then, subject to stirring, 318.5 g (2,068 mol) hexahydrophthalic anhydride, 250.2 g (0.447 mol) dimerised fatty acid and 95.6 g (0.713 mol) dimethylolpropionic acid are added and heated to 220° C. within 6 hours. When an acid number of about 40 mg KOH/g has been attained, cooling is effected to 100° C. and dilution is effected with 428 g Solvesso 100. The polyester-resin solution has a solids content of 70.9% and a viscosity of 2,200 mPa.s/25° C.

Example 4

Into a reaction apparatus that is suitable for synthesis of polyester resin there are weighed 75.2 g (0.817mol) glycerine, 294.1 g (1.838 mol) 2-ethyl-2-butylpropanediol-1,3 and 25 g xylene and, with stationary stirrer, heated to about 80°C. Then, subject to stirring, 376.1 g (2.442 mol) hexahydrophthalic anhydride 250.9 g (0,448 mol) dimerised diol and 47.8 g (0.357 mol) dimethylolpropionic acid are added and heated to 220° C. within 6 hours. When an acid number of about 20 mg KOH/g has been attained, cooling is effected to 100° C. and dilution is effected with 428 g Solvesso 100. The polyester-resin solution has a solids content of 70.9% and a viscosity of 1,200 mPa.s/25° C.

Example 5

Into a reaction apparatus that is suitable for synthesis of polyester resin there are weighed 111.6 g (1.213 mol) glycerine and 200.0 g (1.754 mol) epsilon-caprolactone and, subject to stirring, heated to 160° C. The reaction charge is held for 2 hours at 160° C. Then 291.1 g (1.819 mol) 2-ethyl-2-butylpropanediol1,3, 395.7 g (2.570 mol) hexahydrophthalic anhydride, 47.8 g (0.357 mol) dimethylolpropionic acid are added and 25 g xylene are added and heated to 220° C. within 6 hours. When an acid number of about 20 mg KOH/g has been attained, cooling is effected to 100° C. and dilution is effected with 428 g Solvesso 100. The polyester-resin solution has a solids content of 69.7% and a viscosity of 555 mPa.s/25° C.

PRODUCTION OF THE (METH)ACRYLIC COPOLYMERS

Example 6

Into a 2-liter three-necked flask with ground-glass stopper which is equipped with a stirrer, contact thermometer, ball condenser and dropping funnel there are submitted 60 g vinyl neodecanoate, 148 g Solvesso 100 (commercial product manufactured by Shell AG), 59 g methoxypropyl acetate and 24 g n-butanol and, subject to stirring with reflux condensation, heated to 144° C. Within 5.5 hours a mixture consisting of 13.1 g acrylic acid, 40 g butyl methacrylate, 40 g isobutyl methacrylate, 151.5 g tert.-butylacrylate, 177.7 g 2-hydroxypropyl methacrylate, 10 g di-tert.-butylperoxide and 7.7 g tert.-butylperoctoate is charged continuously. Then the sediment is subjected to further polymerisation for 6 hours at 141° C., cooled to 80° C. and diluted with 170 g Solvesso 100, 43 g xylene and 56 g butyl acetate. The polymer solution has a solids content of 50.5% and a viscosity of 146 mPa.s/25° C.

Example 7

Into a 2-liter three-necked flask with ground-glass stopper which is equipped with a stirrer, contact thermometer, ball condenser and dropping funnel there are submitted 250 g Solvesso 100 (commercial product manufactured by Shell AG), 30 g n-butanol and, subject to stirring with reflux condensation, heated to 142° C. Within 5 hours a mixture consisting of 23 g acrylic acid, 172 g styrene, 216 g ethylhexyl acrylate, 200 g 2-hydroxypropyl methacrylate, 4 g di-tert.-butylperoxide and 25 g tert.-butylperoctoate and 10 g dicumyl peroxide is charged continuously. Then the sediment is subjected to further polymerisation for 4 hours at 143° C., cooled to 80° C. and diluted with 50 g Solvesso 100 and 20 g n-butanol. The polymer solution has a solids content of 65.1% and a viscosity of 2,460 mPa.s/25° C.

PRODUCTION OF THE CLEAR LACQUERS

Example 8

392 parts of the polyester-resin solution from Example 1 and 292 parts of the (meth)acrylic copolymer solution from Example 6 are mixed homogeneously and then, under the revolving stirrer, 21 parts of a commercial phthalate, 24 parts of a mixture of commercial light-screening agents (HALS and benztriazole derivatives in a ratio of 1:1), 14 parts of a 1% xylene solution of commercial silicone oils (flow-control and wetting agents) and 257 parts of a solvent mixture consisting of butylglycol acetate, butyldiglycol acetate, ethoxypropyl acetate and high-boiling aromatic hydrocarbons in a ratio of 12:12:8:68 are added.

Into 100 parts of this solution there are stirred homogeneously 35 parts of an 82% solution of an aliphatic isocyanurate polyisocyanate that is customary in lacquering in xylene: butyl acetate=1:1. This clear lacquer was used for the production of a multi-layer lacquer coating as described below.

With a commercial electrophoretic lacquer that is capable of being precipitated at the cathode (KTL) (18 μm) and that is used in the mass-production lacquering of motor vehicles and a commercial filler (35 μm), precoated body panels were lacquered with commercial water-dilutable metallic base lacquer to a dry-film layer thickness of 15 μm and predried for 6 min at 80° C. Directly afterwards the clear lacquer described above was applied wet-on-wet to a dry-film thickness of 35 μm by spray application and after 5 min exposure to air at room temperature stoved for 30 min at 130° C. (object temperature).

Example 9

Working is analogous to Example 8, with the difference that use was made of 392 parts of the polyester-resin solution from Example 2 and 292 parts of the (meth)acrylic copolymer solution from Example 6.

Example 10

Working is analogous to Example 8, with the difference that use was made of 392 parts of the polyester-resin solution from Example 3 and 292 parts of the (meth)acrylic copolymer solution from Example 6.

Example 11

Working is analogous to Example 8, with the difference that use was made of 392 parts of the polyester-resin solution from Example 4 and 292 parts of the (meth)acrylic copolymer solution from Example 6.

Example 12

Working is analogous to Example 8, with the difference that use was made of 196 parts of the polyester-resin solution from Example 1 and 488 parts of the (meth)acrylic copolymer solution from Example 7. Into 100 parts of this solution there are stirred homogeneously 35 parts of a 69.3% solution of a mixture of hexamethylene diisocyanate trimer and isophorone diisocyanate trimer that are customary in lacquering in a ratio of 1:1, dissolved in xylene, Solvesso 100, butyl acetate and methoxypropyl acetate in a ratio of 25:20:30:25.

Example 13

Working is analogous to Example 8, with the difference that use was made of 128 parts of the polyester-resin solution from Example 5 and 556 parts of the (meth)acrylic copolymer solution from Example 7.

With a view to testing the clear lacquers for scratch resistance the stroke-thrust method was adopted with the Erichsen-Peters block, type No. 265. The dimensions are: 75×75×50 mm, surface area=3,750 mm². The weight amounts to 2 kg. Under the abrasive block a 2.5 mm thick wool felt, tolerances 30 ×50 mm, is attached by adhesion with burry tape. Then 1 g of a water-soluble abrasive paste is evenly distributed on the bearing surface. 10 double strokes are performed in 9 s. The stroke-thrust is effected parallel to the 75 mm edge of the block, the abrasion path amounts to 90 mm in one direction. Then rinsing is effected with cold water, drying is effected and a measurement of the gloss is carried out at an angle of 20°.

By way of measure for the scratch resistance of a lacquer the residual gloss still remaining after the abrasion operation is stated in percentage terms.

$$\text{Residual gloss (\%)} = \frac{\text{Gloss after the abrasion} \times 100}{\text{Gloss prior to the abrasion}}$$

| Example: | Clear lacquers according to the invention: | | | | | | Comparative clear lacquer: DE-A-39 18 968 Example C-2* |
|---|---|---|---|---|---|---|---|
| | 8 | 9 | 10 | 11 | 12 | 13 | |
| Processing solids wt-% | 52.7 | 53.0 | 52.2 | 53.1 | 51.9 | 51.1 | 47.6 |
| Gloss 20°: | 85 | 84 | 86 | 85 | 88 | 89 | 84 |
| Sulphuric acid test: (38% H₂SO₄, 30 min 60° C. | | | | | | | |
| Swelling (min) | 18 | 19 | 30 | 16 | 24 | 28 | 10 |
| Matting (min) | 26 | 25 | >30 | >30 | >30 | 30 | 19 |
| Scratch resistance (%): | 89 | 76 | 77 | 88 | 72 | 78 | 60 |

*This Clear lacquer has a strong tendency towards crystallisation and a very short processing-time.

We claim:

1. A solvent based coating composition containing a binding agent, the binding agent comprising:
   (a) 10 to 80 wt-% of at least one hydroxyfunctional polyester formed by reacting a mixture comprising:
      (i) 10 to 40 mol-% of a 2,2-dialkylalkanediol with two primary OH groups;
      (ii) 10 to 30 mol-% of a polyol with at least one secondary OH group;
      (iii) 20 to 50 mol-% of an aliphatic or cycloaliphatic dicarboxylic acid with fewer than 16 C atoms or anhydrides thereof;
      (iv) 5 to 30 mol-% of a compound selected from the group consisting of dimeric fatty acids, dimeric diols, epsilon-caprolactone, and mixtures thereof;
      (v) 1 to 15 mol-% of a hydroxycarboxyiic acid with at least one hydroxyl group and at least one carboxyl group; and
   (b) 10 to 80 wt-% of a (meth)acrylic copolymer containing a hydroxyl group; and
   (c) 10 to 60 wt-% of a crosslinking agent;
   wherein the sum of the wt-% of components (a)–(c) is 100% of the binding agent.

2. The coating composition according to claim 1, wherein the mixture further comprises up to 30 mol-% of a glycidyl ester of an alpha, alpha-dialkyl-substituted aliphatic monocarboxylic acid.

3. The coating composition according to claim 1, wherein the mixture further comprises up to 3 mol-% of an alpha, beta-unsaturated dicarboxylic acid or anhydride thereof.

4. The coating composition according to claim 1, wherein the hydroxyfunctional polyester has a hydroxyl number of 40 to 200 mg KOH/g, an acid number of 5 to 100 mg KOH/g and a weight average molecular weight of 500 to 6,000 g/mol.

5. The coating composition according to claim 1, wherein the (meth)acrylic copolymer has a hydroxyl number of 30 to 200 mg KOH/g, an acid number of 1 to 50 mg KOH/g, a weight average molecular weight of 2,000 to 20,000 g/mol.

6. The coating composition according to claim 1, wherein the crosslinking agent includes at least one aminoplastic resin.

7. The coating composition of claim 1, wherein the crosslinking agent includes at least one polyisocyanate.

8. The coating composition of claim 7, wherein the polyisocyanate is a free polyisocyanate.

9. The coating composition of claim 7, wherein the polyisocyanate is a blocked polyisocyanate.

10. The coating composition according to claim 1, wherein the coating composition is free from pigment.

11. The coating composition according to claim 1, wherein the coating composition is a clear lacquer and further comprises a transparent pigment.

12. The coating composition according to claim 1, further comprising a lacquer aid.

13. The coating composition of claim 1, wherein the hydroxyfunctional polyester is formed by reacting a mixture comprising:
  (i) 10 to 40 mol-% of 2-ethyl-2-butylpropanediol-1,3;
  (ii) 10 to 30 mol-% of glycerin;
  (iii) 20 to 50 mol-% of 1,2-cyclohexanedicarboxylic anhydride;
  (iv) 5 to 30 mol-% of a dimeric fatty acid;
  (v) 1 to 15 mol-% of dimethylolpropionic acid.

14. The coating composition of claim 1, wherein:
  (i) the 2,2-dialkylalkanediol is 2-ethyl-2-butylpropanediol-1,3;
  (ii) the polyol is 1,2,6-hexanetriol;
  (iii) the cycloaliphatic dicarboxyilic acid is 1,4-cyclohexanedicarboxylic acid;
  (iv) the compound is a dimerized fatty acid; and
  (v) the hydroxycarboxylic acid is dimethylolpropionic acid.

15. The coating composition of claim 14, wherein the mixture further comprises maleic anhydride.

16. The coating composition of claim 1, wherein component (iv) includes a dimerized diol, epsilon-caprolactone, or a mixture thereof.

17. A solvent based coating composition containing a binding agent, the binding agent comprising:
  (a) 10 to 80 wt-% of at least one hydroxyfunctional polyester having a hydroxyl number of 40 to 200 mg KOH/g, an acid number of 5 to 100 mg KOH/g and a weight average molecular weight of 1,000 to 4,000 g/mol, wherein the hydroxyfunctional polyester is formed by reacting a mixture comprising:
    (i) 10 to 40 mol-% ofa 2,2-dialkylalkanediol with two primary OH groups;
    (ii) 10 to 30 mol-% ofa polyol with at least one secondary OH group;
    (iii) 20 to 50 mol-% of an aliphatic or cycloaliphatic dicarboxylic acid with fewer than 16 C atoms or anhydrides thereof;
    (iv) 5 to 30 mol-% of a compound selected from the group consisting of dimeric fatty acids, dimeric diols, epsilon-caprolactone, and mixtures thereof;
    (v) 1 to 15 mol-% of a hydroxycarboxylic acid with at least one hydroxyl group and at least one carboxyl group; and
  (b) 10 to 80 wt-% of a (meth)acrylic copolymer containing a hydroxyl group having a hydroxyl number of 30 to 200 mg KOH/g, an acid number of 1 to 50 mg KOH/g and a weight average molecular weight of 2,000 to 20,000 g/mol.; and
  (c) 10 to 60 wt-% of a crosslinking agent which includes an aminoplastic resin and a blocked polyisocyanate;

wherein the sum of the wt-% of components (a)–(c) is 100% of the binding agent.

18. A solvent based coating composition containing a binding agent, the binding agent comprising:
  (a) 10 to 80 wt-% of at least one hydroxyfunctional polyester formed by reacting a mixture comprising:
    (i) 10 to 40 mol-% of 2-ethyl-2-butylpropanediol-1,3;
    (ii) 10 to 30 mol-% of a polyol selected from the group consisting of glycerin, 1,2,6-hexanetriol, and mixtures thereof;
    (iii) 20 to 50 mol-% of an aliphatic or cycloaliphatic dicarboxylic acid selected from the group consisting of 1,2-cyclohexanedicarboxylic anhydride, 1,4-cyclohexanedicarboxylic acid, and mixtures thereof;
    (iv) 5 to 30 mol-% of a compound selected from the group consisting of dimeric fatty acids, dimeric diols, epsilon-caprolactone, and mixtures thereof;
    (v) 1 to 15 mol-% of dimethylolpropionic acid;
    (vi) up to 3 mol-% ofmaleic anhydride; and
  (b) 10 to 80 wt-% of a (meth)acrylic copolymer containing a hydroxyl group; and
  (c) 10 to 60 wt-% of a crosslinking agent;

wherein the sum of the wt-% of components (a)–(c) is 100% of the binding agent.

* * * * *